Sept. 1, 1925.
J. H. FORD
1,552,288
POULTRY HOUSE AND RUN
Filed April 4, 1924
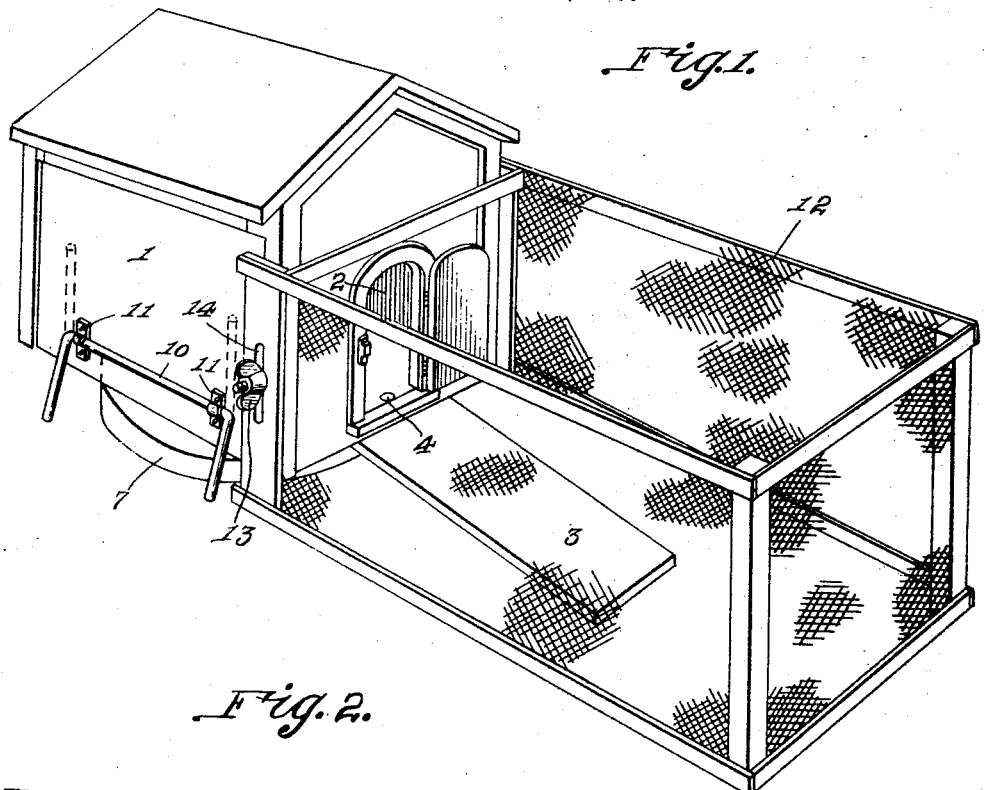
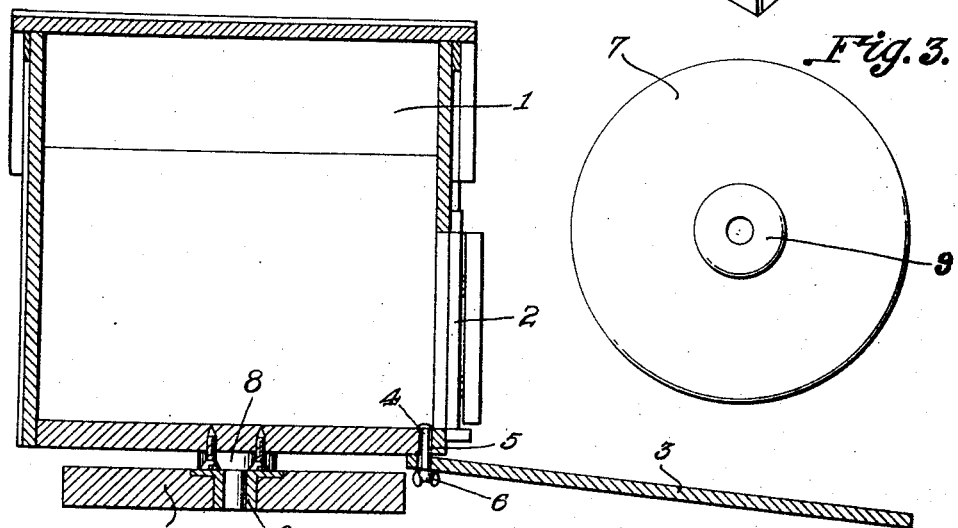
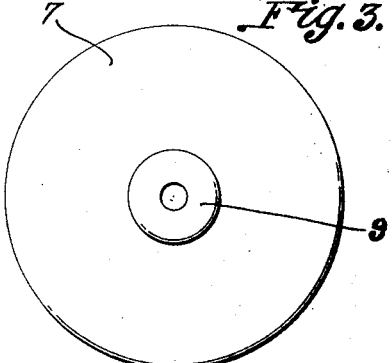
J. H. Ford
INVENTOR
BY Victor J. Evans
ATTORNEY
WITNESS:

Patented Sept. 1, 1925.

1,552,288

UNITED STATES PATENT OFFICE.

JAMES H. FORD, OF BRUNSWICK, MARYLAND.

POULTRY HOUSE AND RUN.

Application filed April 4, 1924. Serial No. 704,242.

*To all whom it may concern:*

Be it known that I, JAMES H. FORD, a citizen of the United States, residing at Brunswick, in the county of Frederick and State of Maryland, have invented new and useful Improvements in Poultry Houses and Runs, of which the following is a specification.

This invention relates to a house which may be used as a brooder or kennel or for other purposes, the general object of the invention being to rotatably support the house so that its door carrying side can be moved to any point of the compass and thus prevent the sun, rain or wind from entering the door.

Another object of the invention is to provide simple means for preventing rotary movement of the house until such means are raised into inoperative position.

A further object of the invention is to provide a run-way which is so attached to the door carrying side of the house that it will move with the house and will adjust itself to uneven ground.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a perspective view of the invention.

Figure 2 is a longitudinal sectional view.

Figure 3 is a view of the base.

In these views, 1 indicates the house which may be of any desired construction and which is provided with a door 2 in one side thereof. A board 3 is adjustably connected to the bottom of the house under the door by means of a bolt 4 passing through a slot 5 formed in the board and having a wing nut 6 thereon so that the board can be adjusted to compensate for uneven ground. This board forms the usual run-way for the house. The house is rotatably connected with a base 7 by means of the projection 8 having its flange fastened to the bottom of the house and engaging a socket 9 formed in the base. A U-shaped bar 10 has its bight rotatably connected with one side of the house by the brackets 11 with its ends adapted to engage the ground to prevent rotary movement of the house until the bar is swung upwardly, as shown in dotted lines in Figure 1. This bar can be moved by the foot of the operator.

A fence 12 forming the usual yard for the house is adjustably and detachably connected with the house by the thumb bolts 13 and the slots 14 so that the chickens are confined in a space in front of the house. This fence is adjustable the same as the runway to permit it to rest on uneven ground.

From the foregoing it will be seen that the house can be rotated on its base to cause the door 2 to face in any desired direction and thus prevent the sun, rain or wind from entering the door and interfering with the comfort of the chicks or other occupants of the house. The runway and fence will move with the house so that fresh ground will be provided on which the chicks can feed and scratch. The house can be taken apart at any time for cleaning and set up in a short while. The member 10 will hold the house against movement after it has been adjusted and the means of attaching the runway and fence to the house will permit the parts to rest on uneven ground.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a poultry house, a base, means for rotatably supporting the house upon the base and a member movably connected with the house and adapted to engage the surface upon which the base is placed in one of its positions for holding the house against rotary movement.

2. A device of the class described comprising a house, a base, means for rotatably connecting the house with the base and a runway and fence adjustably connected with the house.

In testimony whereof I affix my signature.

JAMES H. FORD.